J. BECKMANN.
ELECTRICAL WELDING APPARATUS.
APPLICATION FILED JULY 1, 1909.
1,019,017.
Patented Mar. 5, 1912.
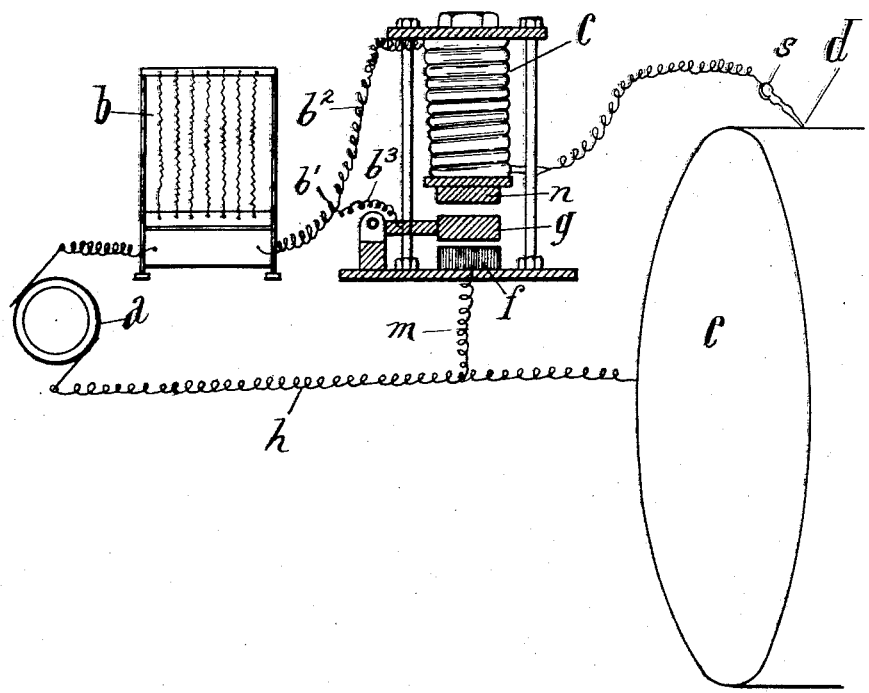

UNITED STATES PATENT OFFICE.

JOHANNES BECKMANN, OF ALTONA, OTTENSEN, GERMANY.

ELECTRICAL WELDING APPARATUS.

1,019,017.      Specification of Letters Patent.      Patented Mar. 5, 1912.

Application filed July 1, 1909. Serial No. 505,395.

*To all whom it may concern:*

Be it known that I, JOHANNES BECKMANN, a subject of the German Emperor, and resident of Altona, Ottensen, Germany, have invented certain new and useful Improvements in Electrical Welding Apparatus, of which the following is a specification.

This invention relates to electrical welding apparatus.

The apparatus forming the present invention comprises a main or welding circuit, a resistance being included in the main circuit, and a shunt circuit connected with the main or welding circuit, through which the current is passed when the welding operation is interrupted. The shunt circuit is closed by means of the provision of an electromagnet contact having a core of soft iron, included in the main circuit, which, when the latter is closed, attracts a contact hammer located below the electromagnet. The shunt circuit is then open, but when the welding operation is interrupted, the contact hammer instantly drops upon a carbon block arranged therebelow, by which operation the shunt circuit is closed. The resistance included in the main circuit and which now forms a part of the shunt circuit takes up the return shock due to the breaking of the circuit, this preventing the transmission of undesirable shocks to the dynamo or generator which furnishes current to the circuits.

According to the present invention metal rods are used in place of carbon electrodes for producing the welding arc, said metal rods serving simultaneously as welding solder. The same material from which the work piece is made can be used as welding solder; for instance iron work pieces can be welded with iron rods as welding solder, but the same can also be welded with copper rods; and weldings of all other metals or metal compositions such as brass, aluminium, platinum and the like can be made in the same manner.

A special advantage of the present welding apparatus using metal rods as electrodes rests in the feature, according to which a comparatively low voltage may be used, eliminating thereby any danger for the workman.

A further advantage consists therein that the easily melting materials, such as sulfur, carbon, phosphorus and the like which are contained in the work pieces to be welded and which, when using the carbon arc, volatilize on account of the great heat produced, remain according to this process in the material of the work piece; according to this invention the work pieces are only heated to a comparatively low degree, so that the same can keep their original compositions on the weld and a uniform, tight, and soft welding is obtained.

A form of construction of such welding apparatus is illustrated in the accompanying drawing.

Referring now particularly to the drawing: The one pole line from the dynamo $a$ passes through the regulating resistance $b$ and at point $b'$ the line separates into a main line $b^2$ and shunt line $b^3$. The main line $b^2$ passes through the electromagnet $c$ to the keeper $s$ of the welding solder $d$. The other pole line $h$ passes from the dynamo $a$ to the work piece $e$. The electromagnet $c$ is provided with an armature $g$ arranged below the same, and below said armature is arranged a carbon block $f$ serving as a contact for the armature $g$. The shunt line $b^3$ is connected with the armature $g$, and connecting the carbon block $f$ and line $h$ is a wire connection $m$. As long as the main circuit, which is the welding circuit, is closed, the current passes through the electromagnet, so that the contact hammer $g$ is attracted by the soft iron core $n$ of the electromagnet and remains out of contact with the carbon block $f$. After the interruption of the main circuit, for instance when the solder $d$ is removed from the work piece, the iron core releases the contact hammer $g$ which at once drops upon the carbon block $f$, by which operation the shunt circuit is closed through wire $b^3$, contact hammer $g$, contact $f$, and wire $m$, the circuit of course including the resistance $b$, the wire $h$, and the source of current. The electrical return shock produced by the interruption of the main circuit is taken up by the resistance $b$, while the dynamo receives no self-induced shocks.

I claim:

1. Welding apparatus comprising a source of electrical energy, a main circuit therefrom containing a resistance, an electromagnet and a welding electrode, an armature for said electromagnet, a contact for said armature having electrical connection therewith when the armature is unattracted by said electromagnet, a shunt circuit from said main circuit, said shunt circuit including said armature and said contact and being adapted to be closed upon the breaking of the main circuit whereby the electromagnet is deënergized and the armature falls and makes electrical connection with said contact block.

2. Welding apparatus comprising a source of electrical energy, a main circuit therefrom containing a resistance, an electromagnet and a welding electrode, a shunt circuit from said main circuit and a contact device in said shunt circuit in coaction with said electromagnet for closing said shunt circuit automatically upon opening of the main circuit.

3. Welding apparatus comprising a source of electrical energy, an electromagnet electrically connected with said source, a welding electrode electrically connected with said electromagnet, a return line to the said source from the work piece, a resistance in electrical connection with said source of electrical energy, an armature for said electromagnet electrically connected with said resistance, a contact block for said armature adapted to be electrically connected therewith when the armature is unattracted by the said electromagnet, and an electrical connection between said return wire and said contact block, said electrical connection, said return wire, contact block, armature and resistance forming a circuit which is adapted to be closed upon the deënergizing of said electromagnet when the welding operation is interrupted.

JOHANNES BECKMANN.

Witnesses:
M. Pastor,
H. Lemke.